May 13, 1969  L. E. FOWLER  3,443,447

RECTILINEAR RECORDER

Filed Nov. 21, 1967

INVENTOR
Leslie E. Fowler
BY
A. M. Fernandez

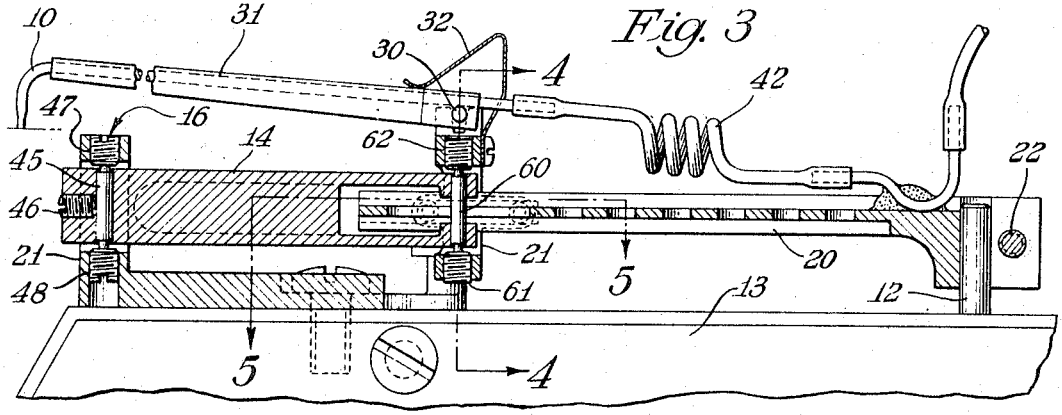
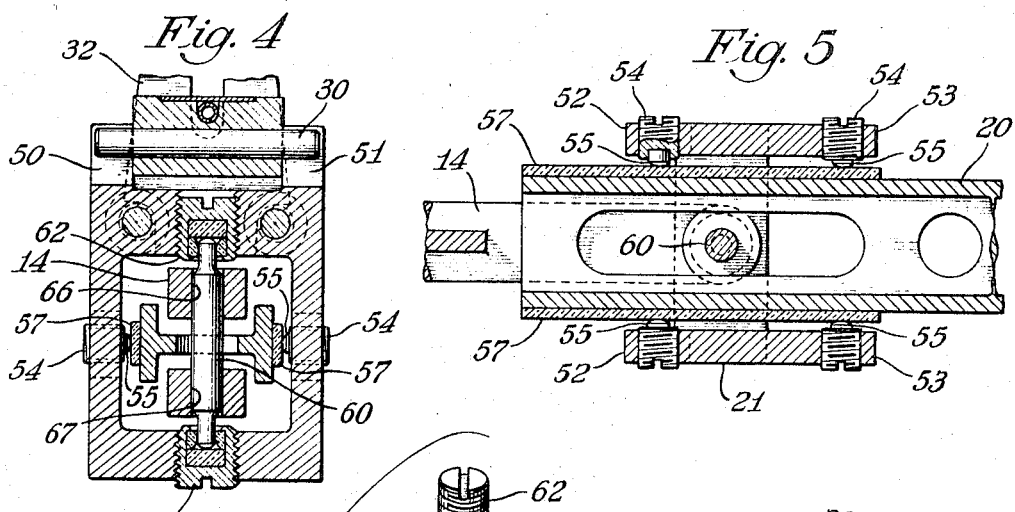
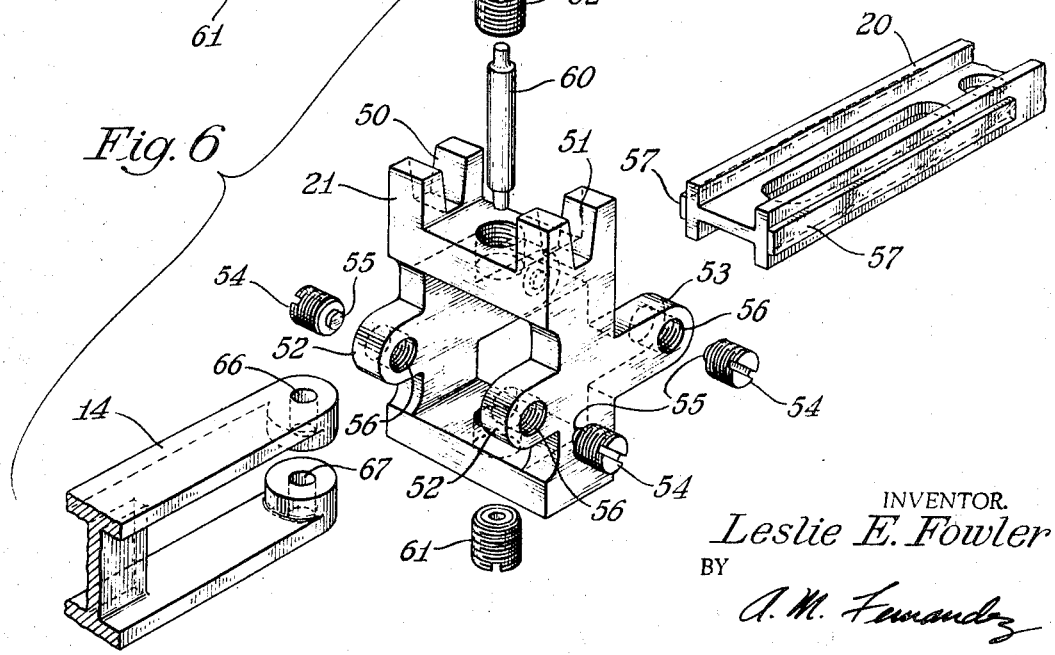

United States Patent Office 3,443,447
Patented May 13, 1969

3,443,447
RECTILINEAR RECORDER
Leslie E. Fowler, Arlington Heights, Ill., assignor to Beckman Instruments, Inc., a corporation of California
Filed Nov. 21, 1967, Ser. No. 684,694
Int. Cl. 16h 21/44
U.S. Cl. 74—103         7 Claims

ABSTRACT OF THE DISCLOSURE

A linkage mechanism for constraining a point on an output arm to move along a substantially straight line path through a distance linearly proportional to a limited angular rotation of an input shaft is provided by an extensible drive assembly having one end connected to the drive shaft and the other end pivotally connected to the free end of a control arm. The other end of the control arm is pivoted at a point which is between the drive shaft and the straight line path and on a line perpendicular to said path. An output arm is connected to the extensible drive assembly and maintained in a straight line therewith as an extension thereof.

---

This invention relates to a linkage mechanism for converting limited angular motion to a substantially straight line motion, and in particular to a linkage mechanism for converting limited angular motion of a drive shaft to proportional straight line motion of a stylus for recording.

Mechanisms have been employed for constraining a stylus or similar device to move along a straight line for recording as well as for other display purposes. Most of these mechanisms are based on the elliptical trammel which employs a floating link or arm. One end of the floating arm carries the stylus or indicator that is moved along a straight line. The other end of the floating arm is constrained to move in a straight line perpendicular to the desired path of the stylus or indicating device. A drive crank is provided with one end pivotally connected to the intersection between the desired path of the indicator and the straight line to which the other end of the floating arm is constrained. The other end of the drive crank is pivotally connected midway between the two ends of the floating arm. Although the motion of the indicating device or stylus of such a basic elliptical trammel is a straight line, the amplitude of the excursion is a non-linear function of the input angle or angular motion of the drive shaft to which the control crank is connected.

An improved mechanism is disclosed in patent 3,312,980 which employs a control link in place of the drive crank of a basic elliptical trammel and a drive crank is slidably connected between the drive shaft and the floating arm with the drive shaft located on the center line of a guide slot which constrains the rearward end of the floating arm to move in a straight line perpendicular to the desired path of the stylus or indicator. In that manner, the linearity error inherent in basic elliptical trammel mechanisms is reduced, but since the drive shaft is not at all times directly below the rearward end of the floating arm, the distance moved by the stylus or indicator along the straight line path is still not linearly proportional to the rotation of the drive shaft, although linearity is improved over the basic elliptical trammel mechanism.

An object of the present invention is to provide an improved linkage mechanism for converting limited angular motion to linearly proportional straight line motion.

In a preferred embodiment of this invention, a control arm is pivoted at a point which is between a drive shaft and a straight line path along which a stylus travels in response to rotation of a drive shaft. The pivot point of the control arm is placed on a line perpendicular to the desired straight line path of the stylus. An extensible drive crank assembly pivotally connects the drive shaft to the free end of the pivoted control arm and an output arm is connected to the extensible drive crank at the pivotal connection between the drive crank and the control arm. The extensible drive crank assembly comprises a beam having one end connected to the shaft and the other end extending beyond the pivotal connection to the control arm. A slide cradle is mounted on the beam and pivotally connected to the control arm. The output arm is maintained in a straight line with the beam as an extension thereof by the slide cradle which, for recording, comprises a beam with V-slots for the output arm held therein by a bias spring in a manner which is common practice. A crystalline alumina face is provided on each side of the beam and the slide cradle is provided with adjustable bearing surfaces, also of crystalline alumina, for adjusting the tolerance between the slide cradle and the beam. The pivot connecting the control arm to the slide cradle is held in place by journal bearings of crystalline alumina.

Other objects and advantages of the present invention will become apparent from the following detailed description of the invention with reference to the drawings in which:

FIGURE 3 is a side view partially in section, the section being taken along the line 3—3 in FIGURE 2.

FIGURE 4 is a full section taken along the line 4—4 in FIGURE 3.

FIGURE 5 is a section taken along the line 5—5 in FIGURE 3.

FIGURE 6 is an exploded view of a portion of the embodiment illustrated in FIGURE 1.

Figure 1:
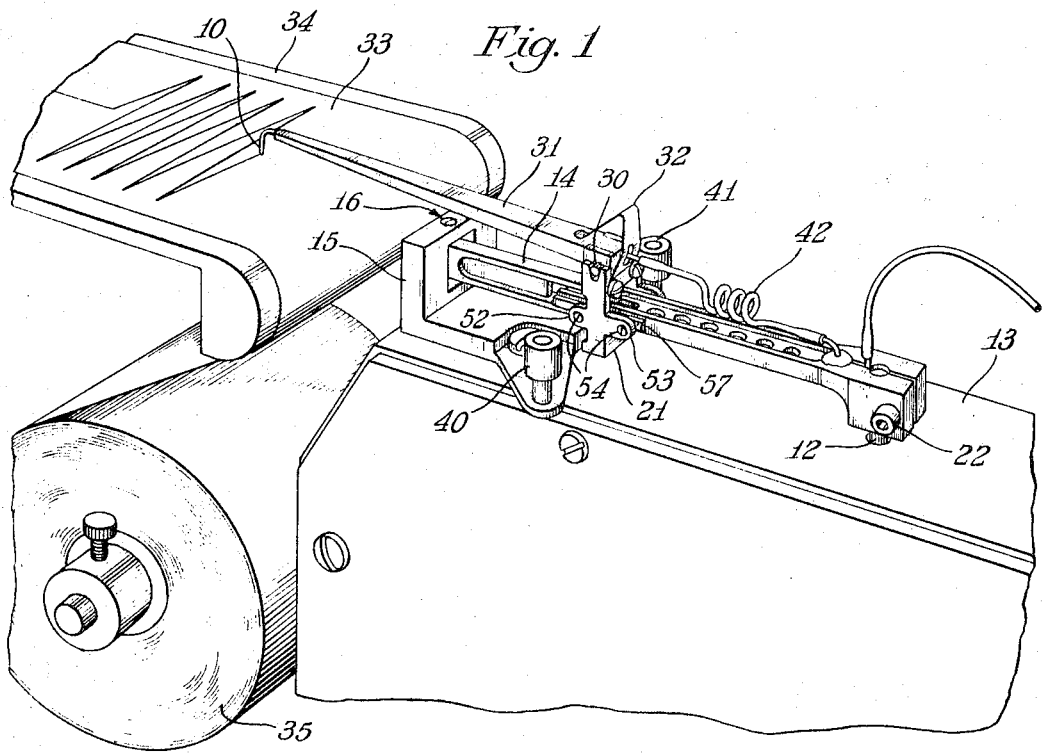
FIGURE 1 is a perspective view of an embodiment of the invention.
Figure 2:
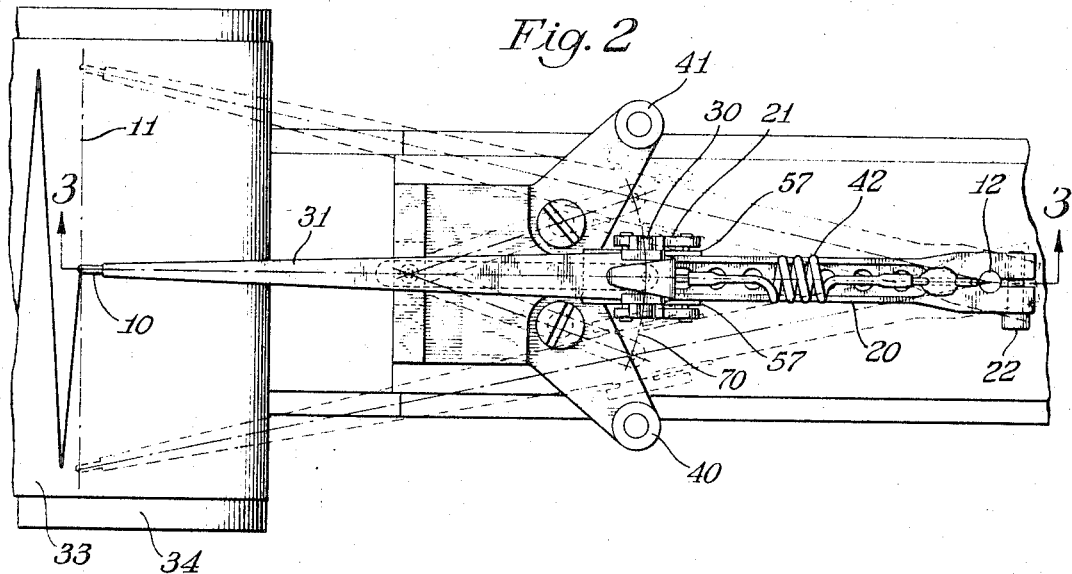
FIGURE 2 is a plan view of the embodiment of FIGURE 1.

Referring now to the drawings, FIGURES 1 and 2 illustrate a linkage mechanism for constraining a pen 10 to move along a substantially straight line path 11 (FIGURE 2) through a distance linearly proportional to a limited angular rotation of a shaft 12 driven by a motor contained within a housing 13. A control arm 14 is connected to a bracket 15 by a pivot assembly 16.

For reasons which will be more fully understood as the description of this invention progresses, the pivot assembly 16 is mounted in the bracket 15 with the pivot thereof in a position parallel to the drive shaft 12 and in a line perpendicular to the straight line path 11.

An extensible drive crank assembly comprising a beam 20 and a slide cradle 21 is pivotally connected at one end thereof to the control arm 14 and fixedly connected at the other end thereof to the drive shaft 12 by a pinching bolt 22. The extensible drive shaft assembly will be described more fully hereinafter with reference to FIGURES 3 through 6.

The upper portion of the slide cradle 21 contains V-slots adapted to receive a trunnion 30 at the root of an output arm 31 in a manner familiar to those who design and use recorders. A bias spring 32 holds the output arm 31 in the V-slots of the slide cradle 21 and holds the pen 10 against a record medium or chart 33 as it is pulled across a writing table 34 from a roll 35 by means not shown.

The slide cradle 21 is allowed to move back and forth along the drive crank beam 20. In that manner motion is transmitted from the drive shaft 12 to the pen 10 through the extensible drive crank crank assembly comprising the beam 20 and the slide cradle 21 constrained to move at all times in a plane passing through the drive shaft 12 and the pivot of the pivot assembly 16 connecting the slide member 21 to the control arm 14.

Since the slide cradle 21 carries the ouptut arm 31 in the plane in which it is constrained to move by the beam 20, rotation of the drive shaft 12 produces horizontal deflection of the pen 10. As the drive crank beam 20 is deflected from the neutral position shown in FIGURE 2 between the two extreme dotted positions shown, the control arm 14 causes the slide members 21 to move out on the drive crank beam 20, thereby moving the pen 10 away from the drive shaft 12 to translate the otherwise curvilinear deflection of the pen 10 to a substantially rectilinear deflection (straight line motion). Since the output arm 31 and drive crank beam 20 are always in a line passing through the drive shaft 12, the deflection of the pen 10 along the straight line path 11 is linearly proportional to the angular motion of the drive shaft 12.

Stops 40 and 41, which may be rubber tubes slipped over posts, are mounted on the bracket 15 to limit the travel of the extensible drive crank assembly, and a coiled flexible tube 42 is provided to feed ink to the pen 10 as the slide member 21 moves out on the drive crank beam 20 as the output arm 31 is deflected from its neutral position.

The drive crank assembly (drive crank 20 and slide cradle 21) and its pivotal connection to the control arm 14, which is in turn connected to the bracket 15 by a pivot assembly 16, will now be more fully described with reference to FIGURES 3 through 6. Referring first to FIGURE 3, the pivot assembly 16 is shown as a pivot 45 firmly attached to the control arm 14 by a set screw 46 and pivotally mounted in journal bearings 47 and 48, each of which consists of a set screw with a silicon alumina bearing surface. In that manner, the height of the arm 14 above the bracket 15 and housing 13 may be readily adjusted. Once the bearings 47, 48 have been adjusted, the entire linkage mechanism is supported between the pivot 45 and the drive shaft 12, so that the pen motor is only subjected to lateral torque loading.

The slide cradle 21 consists of a square frame having V-slots 50 and 51, as may be more clearly seen in FIGURE 6, and a pair of flanges 52 and 53 on each side. An adjusting screw 54 having a crystalline alumina surface 55 is threaded into a hole 56 in each flange in order to adjust the tolerance between the surfaces 55 thereof and a crystalline alumina face 57 on each side of the beam 20 as may be more clearly seen in FIGURE 5.

A pivot 60 is inserted vertically through the center of the sliding cradle 21 and held in place by journal bearings 61 and 62 having crystalline alumina bearing surfaces. The journal bearings 61 and 62 are threaded into the slide cradle 21 for ease in assembly and adjustment. However, before the pivot 60 is inserted in the slide cradle 21, the latter is slipped over the end of the beam 20 until the threaded holes for the journal bearings 61 and 62 are over a slot 65 in the beam 20. The control arm 14, which is bifurcated at the free end thereof as shown in FIGURE 6 is then placed within the slide cradle 21 with holes 66 and 67 aligned with the threaded holes for the journal bearings 61 and 62. The pivot 60 is press fitted into holes 66 and 67 with equal portions extending above and below arm 14. Journal bearings 61 and 62 are then adjusted in place thereby pivotally connecting the control arm 14 to the drive crank beam 20. The slot 65 in the beam 20 allows the slide cradle 21 to move back and forth thereby providing an extensible drive crank assembly pivotally connected to the control arm 14.

This improved linkage mechanism for converting limited angular motion to linearly proportional straight line motion is based on the Conchoid of Nicomedes. The pen 10 at the end of the output arm 31 follows a substantially straight line while the slide cradle 21 follows a conchoid curve. In other words, the locus 70 (FIGURE 2) of the pivot 60 in the slide cradle 21 follows the locus of a point that forms, with the straight line path 11, a constant intercept equal to the length of the output arm 31 on every position of the drive crank assembly for a limited angle of rotation of the shaft 12. In that manner, the pivot 60 follows a conchoid curve while the pen 10 follows a straight path with displacement of the pen 10 linearly proportional to the angle of rotation of the shaft 20.

This conchoid mechanism produces a motion similar to that of an elliptical trammel but is improved in that the drive shaft 12 for the mechanism is at the origin of the conchoid curve, thereby improving the linearity of the conversion from curvilinear to rectilinear motion of the pen 10. The deviation of the pen 10 from the straight line path 11 produced by this mechanism may be calculated from the following equation:

$$D = S - (L - A \cos \alpha + B \cos \theta)$$

where

D is the deviation from the ideal straight line path of the pen 10,

S is the distance from the center of the drive shaft 10 to the straight line path 11, L is the distance between the center of the shaft 10 and the center of the pivot assembly 16, A is the length of the control arm 14 measured from the center of the pivot 45 to the center of the pivot 60, B is the length of the output arm 31 measured from the center of the pivot 60 in the slide cradle 21 to the pen 10, $\theta$ is the angle of rotation of the shaft 11 from the neutral position shown in FIGURE 2, and $\alpha$ is the acute angle between the control arm and a straight line between the center of the pivot assembly 16 and the center of the drive shaft 10.

In the illustrated embodiment of the invention, stops 40 and 41 are so positioned as to provide a maximum of 14.75° for the angle $\theta$.

From an examination of the foregoing equation, it may be seen that the deviation D will be minimum when the length A of the control arm 14 is equal to the length B of the output arm 31. Mechanisms similar in nature where corresponding dimensions are equal have been devised in the past but only in rectilinear recorders in which the pivot of the drive crank which corresponds to the shaft 12 in the present invention is allowed to move back and forth along a straight line perpendicular to the desired straight line path 11. However, such rectilinear recorders do not provide displacement of the pen along a substantially straight line path linearly proportional to the angular rotation of a drive shaft which of necessity is maintained in a fixed position and therefore cannot be always directly under the moving pivot at the rear of the mechanism. In the present invention, the drive shaft 12 is placed at the rear of the mechanism and, of course, fixed in position, thereby improving the linearity of the curvilinear to rectilinear conversion.

Minimum deviation D of the pen from the desired straight line path 11 may of course be also achieved in accordance with the present invention without affecting linearity by providing an output arm 31 equal in length to the control arm 14. However, for the convenience of positioning a firm writing table 34, and a mechanism for driving a record medium 33 from a roll 35 next to the pen motor housing 13, it is preferred to have the output arm 31 longer than the control arm 14 as shown. The dimensions A, B and L are then selected to provide a minimum deviation D. In the present invention the following values have been selected for the lengths A, B and L in a commercial embodiment of a rectilinear recorder designed for a maximum input angle $\theta$ of 14.75°. A equals 1.71 inches, B equals 2.796 inches, and L equals 2.875 inches. S is then equal to 4.5 inches.

Although the present invention has been shown and described with reference to a particular embodiment, it should be apparent to one skilled in the art that many changes and modifications may be made without departing from the spirit and scope of the present invention.

What is claimed is:
1. A linkage mechanism for constraining a point on an output arm to move along a substantially straight line path through a distance linearly proportional to a limited angular rotation of a drive shaft comprising
   a control arm pivoted at a point between said drive shaft and said straight line path, said pivot point being on a line perpendicular to said path,
   an extensible drive crank assembly pivotally connecting said drive shaft to the free end of said pivoted control arm,
   an output arm connected to said extensible drive crank assembly at the pivotal connection between said drive crank assembly and said control arm, and
   means for maintaining said output arm in a straight line with said drive crank assembly as an extension thereof.
2. A linkage mechanism as defined in claim 1 wherein said extensible drive crank assembly pivotally connecting said drive shaft to the free end of said pivoted control arm comprises
   an elongated member having one end connected to said shaft and the other end extending beyond the pivotal connection to the control arm, and
   a member slidably mounted on said elongated member and pivotally connected to said control arm whereby the slidable member provides extensibility for said said drive crank assembly.
3. A linkage mechanism as defined in claim 2 wherein said means for maintaining said output arm in a straight line with said drive crank comprises
   a cradle fixedly connected to said slidable member, and
   means for holding said output arm in said cradle in a plane passing through said pivotal connection and said drive shaft for all angular positions of said drive shaft.
4. A linkage mechanism as defined in claim 3 wherein said elongated member comprises a beam having parallel sides and said slidable member comprises a frame having parallel sides adjacent parallel sides of said beam and a pivot having ends thereof held by said frame in a position parallel to the sides thereof, said pivot passing through the free end of said central arm and through an elongated slot in said beam.
5. A linkage mechanism as defined in claim 4 wherein said beam has faces on the sides thereof made of hard material and said frame includes a pair of flanges on each side thereof, each flange carrying a bearing surface of hard material and means for adjusting the bearing surface against a face of said beam.
6. A linkage mechanism as defined in claim 5 wherein said pivot is fixedly attached to said control arm and journals at the ends thereof are seated in bearings carried by said frame.
7. A linkage mechanism as defined in claim 6 wherein said hard material comprises crystalline alumina.

References Cited

UNITED STATES PATENTS

| | | | |
|---|---|---|---|
| 2,534,569 | 12/1950 | Bowditch | 74—103 |
| 3,115,382 | 12/1963 | Morse | 74—102 |
| 3,147,063 | 9/1964 | Miller | 346—139 |
| 3,054,109 | 12/1962 | Brown | 346—117 |
| 3,312,980 | 4/1967 | Erbach | 346—117 |

FOREIGN PATENTS 534,095    9/1931    Germany.

FRED C. MATTERN, JR., *Primary Examiner.*

W. S. RATLIFF, JR., *Assistant Examiner.*

U.S. Cl. X.R.

346—117